United States Patent [19]

Gray

[11] 4,405,653

[45] Sep. 20, 1983

[54] DEHYDRATED FISH CONCENTRATE AND PROCESS FOR SAME

[76] Inventor: Robert D. Gray, 6 Clarendon St., Gloucester, Mass. 01930

[21] Appl. No.: 287,858

[22] Filed: Jul. 29, 1981

Related U.S. Application Data

[63] Continuation-in-part of Ser. No. 135,733, Mar. 31, 1980, abandoned.

[51] Int. Cl.$^3$ .................. A22C 25/00; A23B 4/04
[52] U.S. Cl. .................. 426/643; 426/471; 426/473
[58] Field of Search ............... 426/643, 465, 471, 473

[56] References Cited

U.S. PATENT DOCUMENTS

| | | | |
|---|---|---|---|
| 81,987 | 9/1868 | Cutler | 426/643 |
| 2,271,272 | 1/1942 | Minde | 426/465 X |
| 2,284,913 | 6/1942 | McComb | 426/465 X |
| 2,340,170 | 1/1944 | Baer | 426/465 |
| 3,057,739 | 10/1962 | Forkner | 426/465 X |
| 3,529,975 | 9/1970 | Gray | 426/643 |
| 4,215,153 | 7/1980 | Kai et al. | 426/643 |

FOREIGN PATENT DOCUMENTS

7189 of 1927 Australia ..................... 426/643

*Primary Examiner*—Robert A. Yoncoskie
*Attorney, Agent, or Firm*—E. Janet Berry

[57] ABSTRACT

A product which comprises essentially dry, storable, dehydrated fibrous fish products and process for making same from various raw materials including without limitation underutilized fish species or deboned fresh or frozen fish scrap and various parts. The process for making the novel product includes mincing, followed by a one-step, controlled, dehydration under conditions of reduced pressure and in the absence of an oxidizing atmosphere such as air, and at elevated temperatures of up to 95° C., and in the absence of any other added ingredients.

5 Claims, No Drawings

DEHYDRATED FISH CONCENTRATE AND PROCESS FOR SAME

This application is a continuation-in-part application of copending application Ser. No. 135,733 filed Mar. 31, 1980, now abandoned, and entitled "Dehydrated Fish Concentrate and Process for Same."

A novel dehydrated fibrous fish product adapted for human consumption and a process for producing same have been developed. The novel product is prepared from raw fish or raw fish scraps, fresh or frozen, which is processed by a one-step, reduced pressure dehydration in the absence of air. The final form of the dehydrated product has a fibrous texture and is off-white in color. The product is unique in that the odor producing bodies, fats and oils are not altered or extracted. When the product is rehydrated or reconstituted in water, it has the same nutritional value, odor and taste as does the whole fish. The dry product does not require refrigeration.

In New England and other sea food processing areas in the United States at the present time there is an abundance of fish by-products which are discarded and rendered as fish meal for animal food as having little or no value for human food. There is also an abundance of fish scraps resulting from fresh fish filleting operation. Both these fish material sources as well as others are available to produce a high protein dehydrated fish product for human consumption.

There are presently over 40 species of fish landed in the New England area at an ever increasing rate. In 1980, there was over 300,000,000 pounds of fresh fish landed in Massachusetts alone. During the same period, there were over 300,000,000 pounds of imported frozen fish blocks landed in the United States, the major portion of which passed through the ports of Gloucester and Boston.

It is possible to identify four areas where presently neglected by-products may be recovered as fish protein for human consumption.

Major fish processors in the New England area utilize fish blocks by sawing the blocks into individual sticks or portions. Cuttings and trimmings from the sawing operations amount to an overall 6% loss of product which ends up as fish "sawdust". This is removed from the plant at little or no value and is of no use, at present, for human consumption.

In general, the salable portion of fresh fish is the fillet cut from the flesh. The remaining fish frame is usually discarded as a by-product and is rendered to produce fish meal. An additional 40% fish flesh may be removed from the frames by use of a "meat bone" separator.

Under-utilized fish and species too small for processing are discarded at sea for lack of a consumer market. Such fish are ideal to be processed for a dehydrated sea food product for human consumption and would comprise additional millions of pounds of available inexpensive food product having a high protein content.

Fish sawdust produced as described above in the Massachusetts are amounts to 23,000,000 lbs. of wet product per year or a potential 5,750,000 lbs. of dried product.

There is approximately 118,000,000 pounds of fish frames used to manufacture fish meal which steps include cooking the whole fish or fish frames followed by the step of processing the water and fish oils from the cooked mass. The solids from the press are dried. The liquid portion from the press is processed through a separator or centrifuge system whereby the fish oil is separated from the water-containing emulsified fish protein. The water is known as stick water. It contains approximately 10% by weight of solids. This stick water is further processed to a 50% by weight of solids product known as fish solubles. This product is currently unfit for human consumption. Neither stick water nor fish solubles are suitable starting materials for the invention process.

Extracting the minced flesh from the frames would result in 18,000,000 lbs. of dried product. The remaining fish bones would result in an additional 18,000,000 lbs. of high mineral fish protein.

The raw materials for the novel dehydrated product of the invention include whole fish or fish parts, and fish scrap derived from frozen fish block cutting operations. The whole fish or fish parts are eviscerated and subjected to processing in a meat/bone separator whereby the flesh is separated from the bone and gristle. The resulting fish flesh is in a minced form.

For example, the starting raw fish material can be underutilized whole fish such as, whiting, hake, or dog fish. A major source of raw material is fish frames (carcass), resulting from fresh fish filleting operations. Normally, fish frames are processed in rendering plants into fish meal. Fish meal and its by-products, fish oil and stick water, are not suitable for human consumption and in no way resembles the invention product. Any white fish frames, for instance, cod, haddock, pollack, or flounder, which are handled under good sanitary conditions, are suitable starting materials for this product.

By following the process of the invention, a novel, final product is obtained which is a dry flaky fiber, having an off-white color and totally fit for human consumption without requiring refrigeration. It is completely stable for storage at room temperature indefinitely if kept sealed in air-tight packaging. The dry product is easily reconstituted by the addition of water or other potable liquid, and has the same taste, textures, and nutritional value as whole fish. A typical analysis of the dehydrated product is as follows:

Specifications

1. Food content:
   Not less than 77% Protein
   Not more than 10% Fat
   Not more than 10% Moisture
2. Bacterial characteristics:
   Total Plate Count: less than about 1000
   Coliform: 0
   *E. Coli.*: 0

The dehydrated fish product is reconstituted for example by the mixing of 1 part fish product and 4 parts water, all parts by weight. The reconstituted product has the same nutrient value as whole fish.

The product needs no refrigeration. It increases in weight by up to 80% when mixed with water. It can be used to form the basis of a food by itself or it may be added to rice, flour, bread, potato, or other vegetables and foods as desired by market preference. It can be shaped or combined with other textures to be reconstituted into fillet form. It is especially useful in countries where refrigeration is in short supply.

The flake or fiber product of this invention differs from known products such as fish flour or fish protein concentrate in that a selected portion of the fish, namely predominantly the fish flesh is the raw material. For this product, no attempt is made to remove odor producing bodies, essential flavors or fish oil by solvent or other means of extraction. Thus it is possible to produce the product at a cost far less than that of fish flour.

It is especially important that the preparation of the deboned, minced fish is such as to avoid damage to the fish fiber. The fish is not subject to milling or grinding. The fish material is pumped into the evaporation system and is kep in a non-foaming condition. Although the fish muscle is broken during the deboning process, the end product results in a fish fiber, and not a powder. The final dehydrated product, because it is not subjected to surface oxidation, is readily reconstituted by absorbing water. Thus, when cooked into a food product, the fish keeps its characteristic fibrous texture and flavorful fish taste. Another essential condition for preparation of this fish product is not to remove or extract the natural fish oils and essential flavors from the fish. It is therefore not necessary to add chemicals to impart the fish flavor or odor.

The process is continuous as a one-step heating and vacuum dehydration. There are no by-products such as is found in fish meal operations where soluble fish protein and fish oil are pressed from the solids after cooking. In prior art the resulting fish water ("stick" water) and oil are treated as two additional products and are generally unfit for human consumption.

The process for manufacturing this product begins with conversion of the raw material to a relatively uniform particulate size which is easily dried. The eviscerated whole fish and/or fish parts from commerical fresh fish filleting operations are subjected to processing in a meat/bone separator whereby the fish flesh is removed from the bones and gristle. The fish flesh is in a minced form following this step. This minced fish and/or fish scrap from commercial frozen fish block cutting operations are then subjected to processing in a vacuum (reduced pressure) dehydrating system. This use of reduced pressure is necessary since the final product characteristics cannot be met if oxygen (an oxidizing atmosphere) is present in a drying system.

During the actual operating conditions, the temperature of the scraped film evaporator starts out at about 95° C. and reduced pressure of 28 inches of mercury. The fish is then pumped into the system where it comes in contact with the wall surface of the evaporator as it is being conveyed through the unit. As the minced fish enters the unit, and as water is evaporated from the fish, the pressure will raise to 18-25 inches of Hg., and the operating temperature will drop to between 40°-60° C. depending on the feed rate of the minced fish. The feed conditions are preferably selected so that the product discharging from the system contains less than ten percent moisture.

There are a number of vacuum dehydration techniques available for use in this process. Freeze-drying, vacuum "wipe-surface" evaporation, and vacuum drum drying are all acceptable.

Although a scraped surface evaporator system is described above, other types of vacuum drying systems are suitable, depending on the availability and cost of such equipment.

Thus, the process to manufacture the dehydrated fish product is essentially summarized as follows:
1. Deboning of fish or fish frames.
2. Heating to 95° C.
3. Pumping the heated product into a reduced pressure, mechanically agitated evaporator, and discharging a dry product under heat controlled conditions.

There are no secondary steps used during processing such as the admission of hot air or steam during the drying stages. There are no chemical additives used to assist in the drying step, and there are no chemicals added to preserve the flavorful taste of the final dried fibrous product. It is important that the process of this invention take place under conditions where-by the dehydration process is rapid and the fish material not allowed to form solid masses, which leads to the adverse effect of non-uniform moisture content. It is also important to control temperature and time in order to insure effective sterilization but avoid use of such prolonged, elevated temperatures which would destroy or damage odor, taste, and texture of the final product.

The following examples are presented as embodiments only and it is not intended to limit in any way the process specifically thereto as to starting materials and conditions of processing or as to equipment used.

EXAMPLE 1

As starting material, 660 pounds of cod fish scrap (fish sawdust) from frozen fish block cutting operations having 8% moisture was processed in a "wipe-surface" vacuum dehydrator. The fish scrap was preheated up to 90° C. in a steam-jacketed mixing vat and pumped at a rate of 7.5 pounds per minute into a steam-jacketed "wipe surface" vacuum dehydrator operated under reduced pressure of 27 inches of mercury and a temperature of about 60° C. During the period of the dehydration, the temperature varied from 50°-60° C. and the vacuum varied from 23-28 inches Hg. The final product was found to contain 10% moisture, and was an off-white color and of loose, fibrous texture.

EXAMPLE 2

Fresh fish scrap was processed in a meat/bone separator. As a starting material, 600 pounds of minced fish was collected from this process. The minced fish, having 79% moisture, was processed in a "wipe-surface" vacuum dehydrator. The minced fish was preheated to 95° C. prior to being pumped into the unit. The feed pump rate was 3 pounds per minute. The vacuum was controlled at 27-29 inches of mercury with a temperature of about 50°-60° C. The final product was found to have 8% moisture.

Other types of fish scrap can also be used to make the dehydrated product.

EXAMPLE 3

The dehydrated fibrous fish flake produced by the process of these Examples is made entirely from edible grade fish fiber or flesh and requires no special packaging or storage conditions after preparation. It may be rehydrated after storage and gives a food product entirely fit for human consumption.

The dehydrated fish product is typically off-white in color and is produced in the form of flake or fibers.

The specifications of the product produced as described above are:
Not less than 77% Protein
Not more than 10% Fat
Not more than 10% Moisture
The bacterial characteristics are:
Total Plate: less than 1000
Coliform: 0
E. Coli.: 0

All analyses were performed according to AOAC standard methods of analysis.

EXAMPLE 4

Experiments were carried out to repeat the process described and claimed in U.S. Pat. No. 81,987 to Cutler.

A. Five pounds of de-boned-comminuted cod fish was used as a raw material. The fish mass was spread on stainless steel trays and placed in a drying oven, which was a precision controlled electric oven. The operating temperature was set and maintained at 105° C. ±5° C. The temperature of the fish material at start was 20° C. No forced air was used to circulate the air. Material was dried for ten hours.

Moisture in starting material . . . 80.1%
Moisture in finished material . . . 12.7%

On removal, the fish had dried into a solid mass. The surface of the mass was drier than the center. After comminutating, the average finished moisture content was determined to be 12.7%. The final product was light brown in color. It has no unpleasant odor but was difficult to reconstitute with water. The reconstituted product had a grit-like texture and little if any, fish flavor.

B. The same quantities and process as those used in Experiment 4A above were employed. However, during the drying period, intermittent chopping and mixing of the fish was performed. The drying time was reduced to five hours with final moisture content found to be 8.2%. The final product was medium to dark brown in color. It was not easily reconstituted with water. It was necessary to work the water into the mass before it finally became dough-like. On testing, it had a grit-like texture and very little if any, fish flavor.

EXAMPLE 5

An attempt was also made to repeat the process described in U.S. Pat. No. 2,284,913 to McComb.

Five pounds of minced fish material was placed on stainless steel trays and the trays were then placed in a vacuum oven. The vacuum oven consisted of electric heating elements whose temperature was held at 350° F. A vacuum of 29 inches of mercury was used. At five minute intervals, the vacuum was reduced in the vacuum chamber. In each instance, after atmospheric pressure was reached, the vacuum chamber was again sealed and a vacuum to 29 inches of mercury was restored. This cycle was continued for 75 minutes, whereupon the trays were taken from the vacuum oven. The fish material had dried to form a solid mass with a light golden color. The material at the surface of the fish mass was much drier than was that in the center. This solid fish mass was again comminuted, placed on stainless steel trays, and placed in the vacuum oven. The same procedure as afore mentioned was undertaken. At the end of the cycle, the fish material was removed from the vacuum oven. The material was a darker color and dried into chunks approximately one inch square. These chunks were fused together but not as solidly as after the heating cycle. Again, the fish material was drier on the surface than in the middle of the chunks. As the fish material was not dry enough, two more cycles as afore mentioned were performed. Each cycle was preceeded by a comminutation process. The final product was a light brown to dark gold nugget of fish material with a moisture content of 12 percent water. The nuggets were hard and gritty in texture. This material was not easily reconstitutable with water and produced a reconstituted product with little fish flavor and an unattractive appearance.

What is claimed is:

1. A process for production under non-foaming conditions of a dehydrated sea food product which consists essentially of dehydrating in one step, in a mechanically agitated evaporator minced raw sea food products in the absence of any other added ingredients under reduced pressure no higher than 30 inches of mercury, in the absence of an oxidizing atmosphere, and at a temperature of up to 95° C., whereby solid masses of the sea food product are unable to form and whereby there is produced a dry, dehydrated product, which, when rehydrated, possesses the fibrous texture, odor and flavor of the original sea food product.

2. The process of claim 1 in which the dehydration step is carried out at a reduced pressure of about 27 inches of mercury and at a temperature of essentially 50°–60° C.

3. The process of claim 1 in which said sea food products are predominantly fish scraps from the fish processing industry.

4. An edible fibrous texture, dehydrated sea food product prepared by the process of claim 1 having not more than about 10% by weight of water and stable to storage without refrigeration.

5. An edible fibrous texture, dehydrated fish product prepared from raw fish having at least about 75% protein, not more than about 10% by weight of water, and less than 1000 total bacterial plate count, and stable to storage without refrigeration and upon reconstitution with water has the same nutritional value, odor and taste as does the original fish.

* * * * *